United States Patent [19]

Kerr

[11] 4,241,310
[45] Dec. 23, 1980

[54] DELAY LINE DIGITAL CODE DETECTOR

[75] Inventor: Leo A. Kerr, Baltimore County, Md.

[73] Assignee: The Bendix Corporation, Southfield, Mich.

[21] Appl. No.: 889,164

[22] Filed: Mar. 23, 1978

[51] Int. Cl.³ ............................................. H03K 5/26
[52] U.S. Cl. .................................... 328/119; 307/232; 328/110
[58] Field of Search ....................... 328/119, 109, 110; 307/232, 234

[56] References Cited

U.S. PATENT DOCUMENTS

| 2,706,810 | 4/1955 | Jacobsen | 328/119 X |
| 2,950,463 | 8/1960 | Brunn | 328/119 X |
| 3,051,928 | 8/1962 | Sullivan | 328/119 X |

Primary Examiner—John Zazworsky
Attorney, Agent, or Firm—W. G. Christoforo; Bruce L. Lamb

[57] ABSTRACT

Digital codes, each of which is comprised of a series of equally spaced pulse positions bracketed by framing pulses are passed through a delay line having a plurality of taps. The taps are connected in a gating structure which extracts only valid codes and suppresses garbled and phantom codes.

7 Claims, 5 Drawing Figures

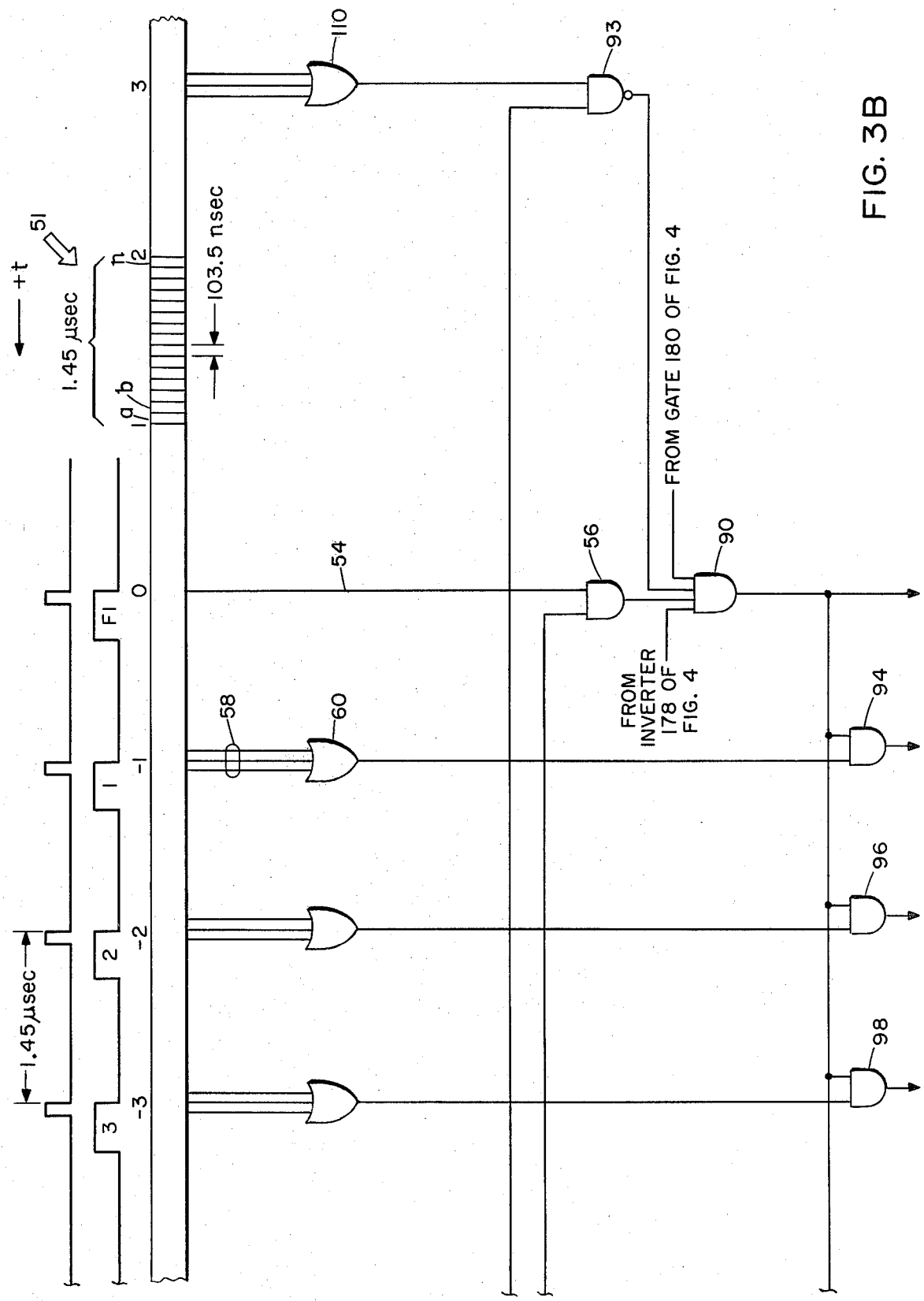

DELAY LINE DIGITAL CODE DETECTOR

BACKGROUND OF THE INVENTION

This invention relates to delay line digital code detectors and to digital delay line detectors which have particular use in detecting valid replies from transponders operating in the air traffic control radar beacon system.

The present air traffic control radar beacon system includes a network of ground beacons which generally transmit interrogation signals into the air space comprising their field of interest and airborne transponders which respond to received interrogations by transmitting a code indentifying the aircraft or its altitude, depending on the specific interrogation signal transmitted by the ground station. As presently constituted, a transponder response consists of a pair of bracket or framing pulses spaced a predetermined time apart, which bracket pulses enclose 13 equally spaced information positions, each of which may or may not be occupied by a pulse depending upon the informational content of the response. In addition, the response can include an indentification pulse which trails the final framing pulse by a predetermined time. Responses received at a ground beacon interrogator or other receiving station are detected and the informational content extracted therefrom for air traffic control purposes. Since in the present air traffic control radar beacon system interrogations are transmitted in a narrow beam radiated from the ground station, responses received from a particular interrogation identify the azimuth of the responding transponder with respect to the station.

Considering the large number of beacon interrogators in many areas and the large number of aircraft having transponders which are operating in the field of interest, it is not surprising that a large number of unsynchronized replies or responses from ambiguous azimuths are received at each interrogator. Extracting only valid responses from the large number of responses received and suppressing garbled information obviously constitutes a problem.

It can be seen that it is highly desirable and often imperative that garbled responses be inhibited. By a garbled response is meant the simultaneous arrival at a receiving station of responses from two or more separate transponders so as to interfere with the extractions of information from the various responses. It is also important that phantom replies be suppressed. Phantom replies are apparent replies to interrogations which manifest themselves at the receiving station as properly spaced framing pulses but which in actuality are comprised of a first framing pulse received from one transponder and consisting either of an actual framing pulse or an informational pulse from that transponder's response and a second apparent framing pulse which consists of either an actual framing pulse or an informational pulse from the other transponder's response.

SUMMARY OF THE INVENTION

According to the present invention, a stream of input pulses received at a receiving station and which may or may not comprise a valid response to an interrogation is passed through a single delay line having a plurality of spaced taps. Two of the taps, herein termed framing taps, are time spaced in accordance with the spacing of the framing pulses of a valid response. Simultaneous outputs at these framing taps indicate that a valid response may be available at the taps intermediate to framing taps.

Whether the signal within the framing taps actually comprises a valid response is determined by examining pulses in the pulse stream immediately prior and subsequent to the framing taps instantaneously with the detection of pulses at the framing taps. This examination is performed by a gating circuit which receives inputs from various of the delay line output taps.

It is thus an object of this invention to provide a delay line digital code detector.

Another object of the invention is to provide a detector of the type described which suppresses garble from a stream of pulses which may or may not include a valid response to an air traffic control radar beacon system interrogation.

A further object of the invention is to provide a detector of the type described which eliminates phantom responses from a stream of pulses which may or may not include a valid response to an air traffic control radar beacon system interrogation.

These and other objects of the invention will become apparent to one skilled in the art by reading of the following description of preferred embodiment and a study of the attached drawings.

BRIEF DESCRIPTION OF THE DRAWINGS

FIGS. 3A and 3B are block diagrams taken together which aid in understanding the invention.

DESCRIPTION OF THE PREFERRED EMBODIMENT

Figure 2:
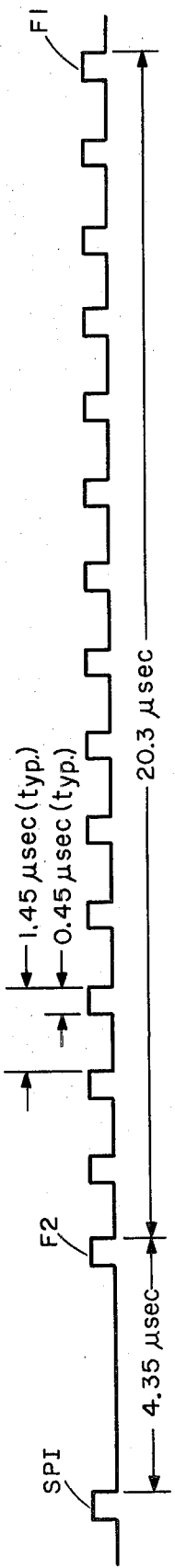
FIG. 2 illustrates a typical response to an air traffic control radar beacon system interrogation.

Refer first to FIG. 2 which illustrates a typical response to an air traffic control radar beacon system interrogation, which response is normally transmitted by an airborne transmitter after it has received an interrogation. At the present time a response comprises two framing pulses F-1 and F-2 20.3 microseconds apart. A valid response is defined by the presence of the two framing pulses. Thirteen equally spaced pulse positions, herein termed positions 1 through 13, are distributed between the framing pulses. It should be understood that although in this illustration all 13 information pulses are shown the informational content of the response depends upon which particular pulses are transmitted. That is, for a particular response not every informational pulse is normally transmitted. However, if an informational pulse is transmitted, it is transmitted in the time position illustrated. Specifically, the informational pulse positions are spaced 1.45 microseconds with the typical pulse duration being 0.45 microseconds. A special identification (SPI) pulse position follows framing pulse F-2 by 4.35 microseconds. As known to those skilled in the art, the SPI pulse is transmitted by the responding aircraft in response to a special interrogation and identifies the responding aircraft more particularly. The time tolerances in each case at present are defined as ±0.1 microseconds.

Figure 1:
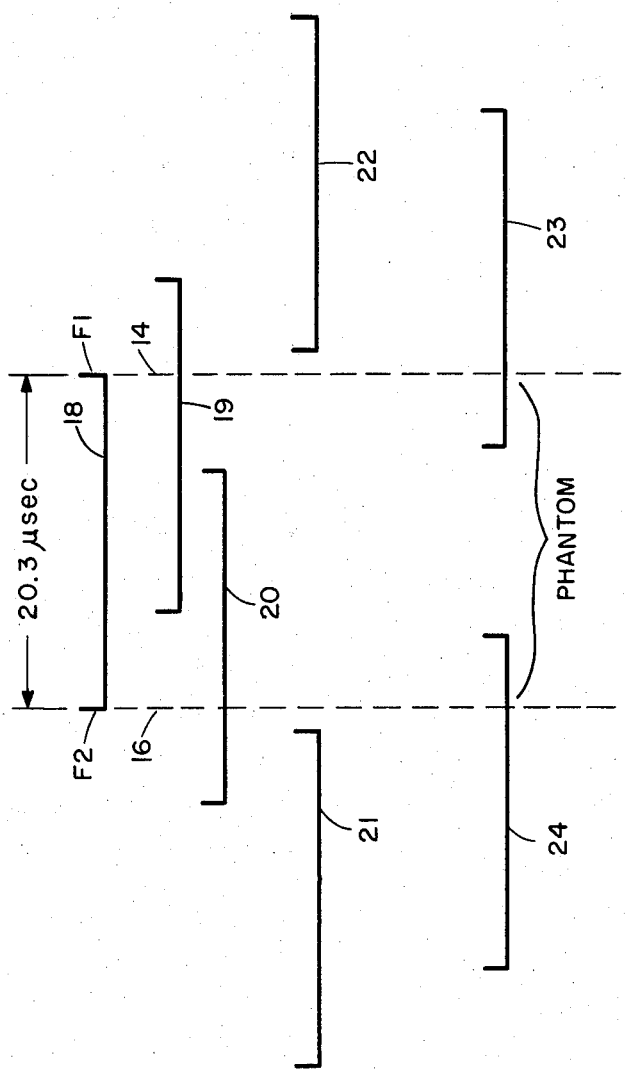
FIG. 1 is a representation of response to air traffic control radar beacon system interrogations and is helpful in explaining various terms used in describing the invention.

Refer now to FIG. 1 which shows two dashed reference lines 14 and 16 represented as being spaced 20.3 microseconds. Also shown are typical responses 18 through 24. The responses are identified by their essential characteristics, that is, framing pulses F-1 and F-2 as shown with respect to response 18. For clarity, representation of the information pulses has been omitted in this figure. Assuming that lines 14 and 16 represent taps on a delay line and examining particularly response 18 it can be seen that the simultaneous appearance of framing pulse F-1 at tap 14 and framing pulse F-2 at tap 16 indicates that a valid response is contained within the delay line.

Taking responses 19 and 20 as an overlapping group contained within a single delay line, it can be seen that there is a high probability that an informational pulse on response 19 will be present at tap 14 at the same time an informational pulse from response 20 appears at tap 16. Although this appears to satisfy the criteria for a valid response contained in the delay line, it is obvious that no such valid response in present and a sampling of the contents of the delay line at this time will provide garbled information. If additional delay line taps are provided to the right of tap 14 and to the left of tap 16, the detection of pulses at these taps simultaneous with the appearance of pulses at taps 14 and 16 provides a strong indication of garble. However, examining responses 21 and 22 together it can be seen that the presence of closely spaced pulses outside of taps 14 and 16 does not always indicate that there is possible garble in the delay line, in this case there being no informational pulses in the delay line.

Consider the responses 23 and 24 as a group. In this case, the responses do not overlap. However, an information pulse from response 23 at tap 14 might simultaneously appear with an information pulse from response 24 at tap 16. Although this condition also appears to satisfy criteria for a valid response lying between taps 14 and 16, obviously no such valid response is present therein. Also note that there is no garble since the responses do not overlap and hence could be detected individually. This condition is known as phantom response. The device to be described immediately below recognizes both possible garble and phantom responses and permits detection only of valid responses.

Figure 3A:
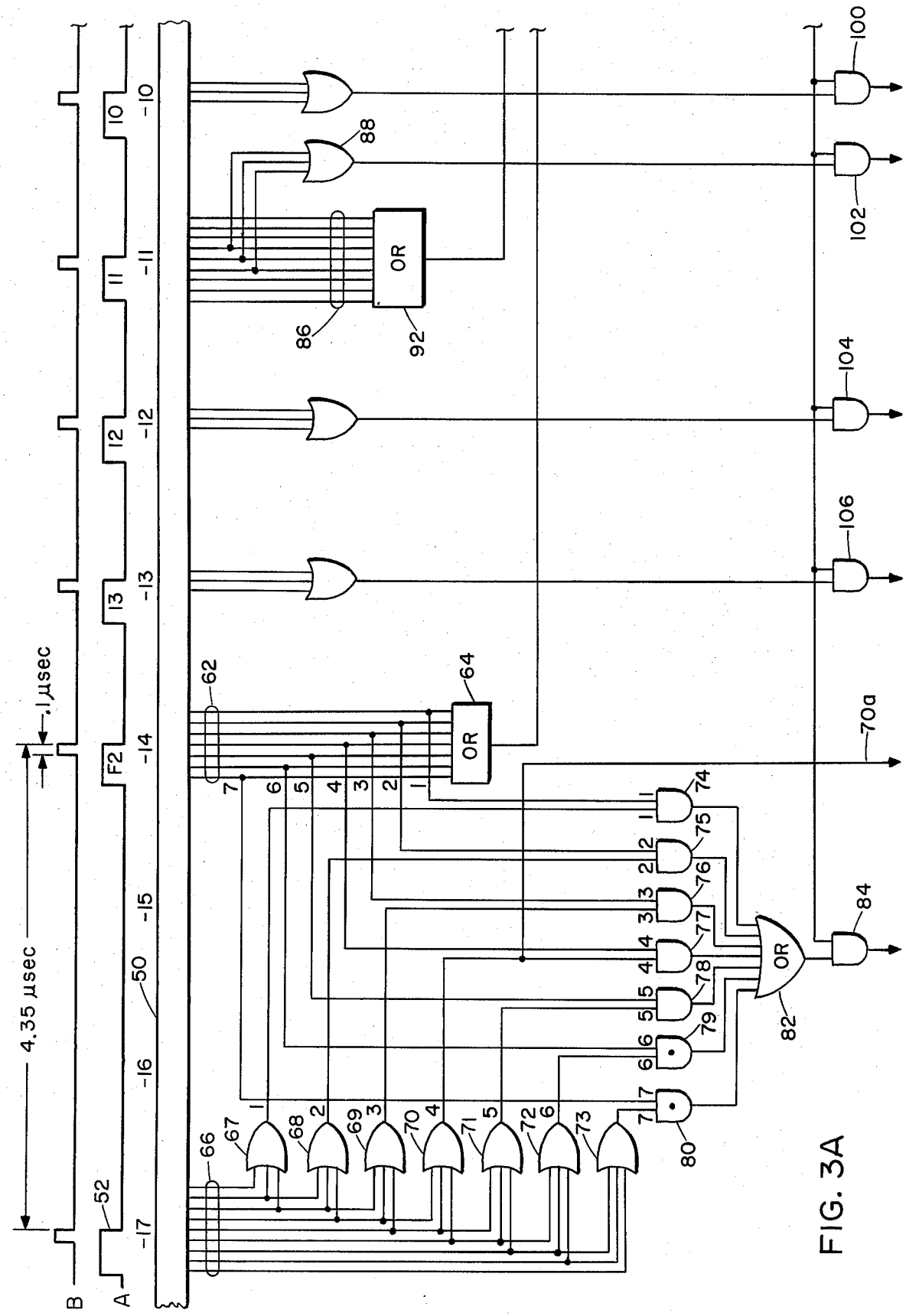

Refer now to FIGS. 3A and 3B, which taken together are herein referred to as FIG. 3 and which shows a portion of the delay line digital code detector of the invention and more particularly the central portion of the delay line of the invention. In particular, FIG. 3 is used to illustrate how a possibly valid response is detected. A portion of the delay line is shown generally as item 50. Line A of FIG. 3 is an illustration of a valid response including framing pulses F-1 and F-2 and the information pulses 1 through 13, the figure having been cropped because of space limitations to not show informational pulses 4 through 9 since the explanation of the delay line elements for processing these pulses is identical to the explanation of the operation of the delay line elements for processing shown informational pulses as will become obvious below. At line B of FIG. 3 is shown the response after it has been processed by a leading edge detector of the prior art type. It is assume that the input to the delay line of the invention comprises pulses of the type shown at line B. For the purposes of this explanation the pulses of line B carry the same designation as the standard pulses of line A, that is framing pulses F-1 and F-2, informational pulses 1 through 13 and special identification pulse 52. As seen in the present embodiment, the pulses of line B which are propagating through the delay line are 0.1 microseconds in duration and separated at 1.45 microsecond intervals. The special identification pulse follows framing pulse F-2 by 4.35 microseconds. As known to those skilled in the art, the pulses are generally spaced with respect to the leading framing pulse F-1 with the exception of the special identification pulse which is timed with respect to framing pulse F-2.

Delay line 50 is comprised of a plurality of output positions which include positions 0 through −14 together with other positions to be described later, these positions being generally separated by 1.45 microseconds at the delay line clock rate. This spacing, it will be recalled, is the spacing of the pulses of the response. Further, delay line 50 is comprised of a large plurality of individual delay elements, normally flip flops, and specifically, in this embodiment, 14 flip flops between delay line positions; for example, the 14 flip flops a, b . . . n generally shown at 51 between delay line positions 1 and 2. The delay line is clocked at approximately 103.5 nanosecond intervals to provide the 1.45 microsecond spacing between output positions. The delay line is provided with a single tap 54 at position 0 which tap provides one input to AND gate 56. The other delay line positions, with the exception of positions −11, −14 and −17, are provided with taps at 3 adjacent flip flops which are provided as inputs to associated OR gates. For example, position −1 is tapped at 3 adjacent flip flops by the 3 taps generally designated 58 and which provide input to OR gate 60. For the purposes of this invention, the center tap is connected to the flip flop which is a multiple of 14 units displaced from the tapped flip flop at position 0. These multiple taps are provided to allow for the time tolerance of the spacing of the various informational pulses from framing pulse F-1.

As can be seen, seven adjacent flip flops at delay line position −14 are tapped by the taps generally designated as 62 and which provide input to OR gate 64. It should be noted that position −14 will contain framing pulse F-2 when a valid response is contained between positions 0 and −14. This greater number of taps at position −14 provides for the greater time tolerance in the positioning of the framing pulses. It should be understood that with improved time tolerances between the framing pulses certain of the taps 62 can be eliminated consistent with the tolerance. Generally, if taps at position −14 are to be eliminated because of improved tolerance those taps farthest away from the center tap are eliminated first.

In this embodiment position −17 is provided with 9 taps, the center tap being spaced 42 flip flops from the center tapped flip flop at position −14. This, of course, corresponds to a time spacing of 4.35 microseconds which is the nominal time spacing between framing pulse F-2 and the special identification (SPI) pulse 52. The taps at position −17 are generally identified as 66. The 9 taps are arranged in 7 groups of 3 adjacent taps each and provide inputs respectively to OR gates 67 through 73. Each group of 3 taps at position 17 is tied through its associated OR gate to an associated AND gate, specifically and respectively to AND gates 74 through 80. The other input to each of the aforementioned AND gates is that tap at position −14 which is spaced 42 flip flops from the center tap of its associated group of 3 taps at position −17. This arrangement provides for the time tolerance between framing pulse F-2 and the special identification pulse 52. As should be obvious, some of the taps at position −17 can be eliminated, thus eliminating the associated OR and AND gates, if the tolerance is improved.

The output taps of AND gates 74 through 80 are connected as inputs to OR gate 82, whose output tap is connected to an input tap of AND gate 84.

For purposes to be explained below, information position −11 is provided with 9 taps, the center tap of which is spaced from tap 54 by 11 times 14 flip flops. These taps are generally designated at 86. The center 3 taps at position −11 are also connected as inputs to OR gate 88. As will become clearer below, an output signal from OR gate 88 at the same time AND gate 90 passes a signal indicates that there is an informational pulse available in a valid response at position −11. As can be seen, taps 86 are connected to OR gate 92. It is sufficient at the present time to explain that OR gate 92 prevents garble under certain circumstances from being interpreted as a valid response.

In operation a response enters the shown portion of delay line 50 of FIG. 3 at the left-hand side thereof and is clocked therethrough towards the right-hand side at the 103.5 nanosecond rate previously mentioned. Assuming a valid response is traversing the delay line and assuming further that it lines up as indicated in the figure, that is with framing pulse F-1 at position 0 and framing pulse F-2 at position −14, a signal will proceed through lead 54 and from OR gate 64 to open gate 56 to provide an input signal to gate 90. Assuming also that at the same time inverting gate 93 is generating an output together with outputs from gate 180 and inverter 178 of FIG. 4, gate 90 will generate an output indicating that a valid response is contained between positions 0 and −14. The output signal from gate 90 qualifies the various AND gates 94, 96, 98, 100, 102, 104, and 106. If the informational pulses are present between the framing pulses, their associated OR gates, for example OR gates 60 and 88, will respectively generate an output which will pass through the qualified AND gates to provide the information contained in the response. If at the same time the special identity pulse 52 is present, at least one of the taps at position −17 will be energized and a signal will pass through at least one of the OR gates 67 to 73, thereby opening at least one of the AND gates 74 to 80 so that the signal proceeds through OR gate 82 and through AND gate 84 which has been qualified by the signal from AND gate 90, the output of AND gate 84 signifying that the special identification pulse is present.

Assume further that a short period of time passes and the signal illustrated at line B moves so that framing pulse F-1 is at position 3, framing pulse F-2 is at position −11 and the special identification pulse is at position −14. If the third informational pulse is present at that time it will be at delay line position 0 so that tap 54 and OR gate 64 will provide inputs to AND gate 56. This, of course, causes AND gate 56 to generate an output which is applied to AND gate 90. However, the framing pulse F-1 at position 3 will cause an input to gate 93 from OR gate 110 and another input to gate 93 from OR gate 92 caused by framing pulse F-2 at position -11. Gate 93 will thus open, but being an inverting gate will inhibit gate 90 so that it generates no output thus maintaining the various AND gates 94 to 106 in a closed condition. In addition AND gate 84 is maintained closed for the same reason. Thus, under this condition it can be seen that no false information will be provided.

Figure 4:
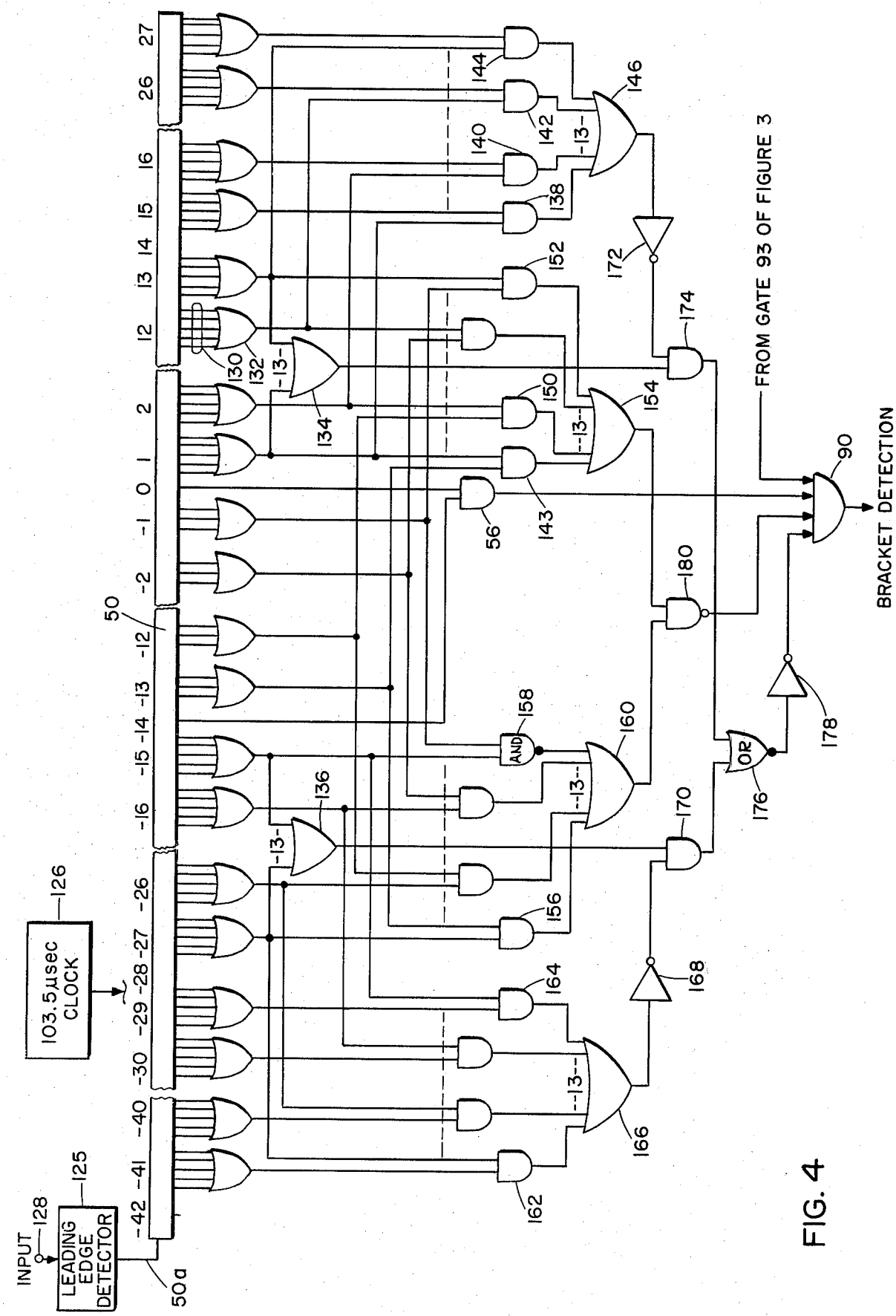
FIG. 4 is a block diagram of the invention.

Generally, a complete delay line digital code detector made in accordance with the principles of the present invention is shown in FIG. 4, reference to which should now be made. Since some of the circuitry is repetitious, certain elements thereof are not shown for clarity of demonstration. These missing elements are generally implied by the use of dash lines as is usual in descriptions of repetitious items. Referring now particularly to FIG. 4, delay line 50 is seen to be comprised of 70 positions numbered from −42 to 27 and including at 0 position as previously seen in FIG. 3. Of course, as previously mentioned with respect to FIG. 3, the delay line includes 14 flip flops between each position with the delay line being strobed by clocks at 103.5 nanosecond intervals from a source 126 as previously described. In this manner a pulse traversing the delay line in response to the clock applied thereto will move from one delay line position to another in 1.45 microseconds. Received video responses are applied at input terminal 128 to leading edge detector 125 so that the signal equivalent to the received responses such as that seen at line B of FIG. 3 is applied to the input 50a of the delay line. That portion of the delay line in FIG. 4 between position 0 and −14 and position −17 and the interconnections thereto and the associated gates are identical to those seen and previously described with respect to FIG. 3 and is hence not shown completely in FIG. 4 for the sake of clarity. It should thus be understood that the circuit of FIG. 3 is to be superimposed on the circuitry of FIG. 4 to produce the complete embodiment of the invention, the purpose of FIG. 3 having been to describe how a valid response is recognized and the purpose of FIG. 4 being to describe how garble and closely spaced signals are recognized. In addition to the delay line taps shown in FIG. 3, each delay line position −41 to −29, −27 to −15, 1 to 13, and 15 to 27 is provided with five taps connected respectively to five adjacent delay line flip-flops which feed an associated OR gate. As explained with respect to FIG. 3, the center tap of each group of five taps is separated from the center tap of adjacent groups by 14 flip flops. An example of the above are the five taps generally designated 130 connected to the OR gate 132. Those OR gates repesented by OR gate 132 and associated with delay line positions 1 through 13 have outputs which are connected to the input of OR gate 134. In like manner, the outputs from OR gates similar to OR gate 132 and associated with delay line positions −27 through −15 are connected as inputs to OR gate 136. In addition, the outputs from OR gates separated by 14 delay line positions are connected as inputs to a single AND gate. For example, the output of the OR gate associated with position 1 together with the output of the OR gate associated with position 15 are connected as inputs to AND gate 138. In like manner the output of the OR gate associated with position 2 is connected together with the output of the OR gate associated with position 16 to AND gate 140. This type of circuit arrangement continues for those OR gates associated with positions 3 to 11 and 17 through 25, respectively, those OR gates not being shown in this figure but implied as previously mentioned. Also in like manner, the outputs from OR gates associated with positions 12 and 13 are connected respectively with the outputs from the OR gates associated with positions 26 and 27 to AND gates 142 and 144. The output taps of AND gates 138 through 144 are connected as inputs to OR gate 146.

In like manner, the output of the OR gate associated with position 1 is connected together with the OR gate associated with position −13 to AND gate 143. In like manner, the output of the OR gate associated with position −1 is connected as an input together with the output of the OR gate associated with position 13 to AND gate 152. The output of AND gates 143 through 152 are connected as inputs to OR gate 154.

In like manner, as described above, the output of AND gates 156 through 158 are connected as inputs to OR gate 160 and the outputs of AND gates 162 through 164 are connected as inputs to OR gate 166.

The output signal from OR gate 166 is inverted by inverting amplifier 168 and applied as input to AND gate 170 which also receives an input directly from OR gate 136. As will be explained below, an output signal from AND gate 170 indicates the possibility that a detected response is garbled. In like manner the output signal from OR gate 146 is inverted by inverting amplifier 172 and applied as one input to AND gate 174 whose other input is received from OR gate 134. An output signal from AND gate 174 also indicates that a detected response can be garbled. The output signals from AND gates 170 and 174 are passed through OR gate 176 to provide the garble signal. The signal from gate 176 is inverted by inverter 178 and applied as one input to gate 90 which is also seen at FIG. 3.

Returning now to gates 154 and 160 it can be seen that an output from both of these gates indicates the possibility that a signal within the framing taps 0 and −14 might possibly be a phantom signal whereas an output from one or no gates indicates that no phantom is present. The output from gates 154 and 160 are applied to inverting gate 180 whose output is also applied as an input to gate 90. As previously explained with respect to FIG. 3 the output signal from gate 56 (seen here and also in FIG. 3) and the output signal from gate 92 of FIG. 3 are also applied as inputs to gate 90. Thus, in the absence of a phantom signal, that is with an output signal from gate 180, and the absence of garble, that is with a signal output from inverter 178, and with bracket detection evidenced by the output signal from gate 56, and further in the absence of the special identity pulse lineup at delay line tap −14 as evidenced by a signal from gate 93 of FIG. 3, the bracket detection gate 90 will generate an output which was seen at FIG. 3 to sample the information pulse positions of the signal contained between delay line taps −1 and −13.

It should be noted that if one response is exactly interleaved with another response that these specific responses are not garbled. By interleaving is meant that the pulses of one response fall between the pulses of another response. As should be obvious, the device described at FIGS. 3 and 4 will detect each of these non-garbled interleaved responses individually.

Having explained this embodiment of my invention various modifications and alterations thereof should now be obvious to one skilled in the art. Accordingly, I claim as my property all that subject matter covered by the true spirit and scope of the appended claims.

The invention claimed is:

1. In a beacon target detector comprising a digital delay line having an input port for receiving a signal comprised of a series of pulses to be detected, the format of said received signal being first and second framing pulses separated by a known time and a predetermined plurality of informational pulse positions spaced at known intervals between said framing pulses, the presence or absence of informational pulses at said informational pulse positions being indicative of the informational content of said received signal, said digital delay line having a plurality of output tap means for determining the presence or absence of pulses at predetermined positions generally equally spaced along the length of said delay line, and a source of clock pulses, said clock pulses being applied to said digital delay line to cause pulses received at said input port to be traversed through said digital delay line, the pulse repetition frequency of said clock pulses having a relationship to the spacing of said framing pulses, said informational pulse positions and said plurality of output means whereby said informational pulses and framing pulses periodically are aligned with said output means, an improvement wherein said digital delay line has a length equivalent to approximately five times the length of the spacing between framing pulses of a received signal and is divided into five generally equilength sections, said sections being arbitrarily designated from the input end of said delay line to the output end of said delay line respectively as first, second, third, fourth and fifth sections, said third section having first and second framing pulse tap means and information pulse position tap means to accommodate simultaneously and respectively said framing pulses and said informational pulses, said first framing pulse tap means being separated from said second framing pulse tap means by the length of spacing between framing pulses of a received signal, and including:

first gate means responsive to the occurrence of a pulse at any one of the output tap means of said second section for generating a first signal;

second gate means responsive to the simultaneous occurrence to pulses at tap means of said first and second sections separated by an amount equivalent to the time between said framing pulses for generating a second signal;

a bracket detection means responsive to the simultaneous occurrence of pulses at said first and second framing pulse tap means for sampling the informational pulse position tap means; and first inhibit means responsive to the occurrence of said first signal and the simultaneous non-occurrence of said second signal to generate a first inhibit signal, said bracket detection means being responsive to said first inibit signal to inhibit sampling of said information pulse position tap means.

2. The improved beacon target detector of claim 1 including:

third gate means responsive to the occurrence of a pulse of any one of the output tap means of said fourth section for generating a third signal;

fourth gate means responsive to the simultaneous occurrence of pulses at tap means of said fourth and fifth sections separated by an amount equivalent to the time between said framing pulses for generating a fourth signal; and second inhibit means responsive to the occurrence of said third signal and the simultaneous non-occurrence of said fourth signal for generating a second inhibit signal, said bracket detection means being additionally responsive to said second inhibit signal to inhibit sampling of said informational pulse position tap means.

3. The improved beacon target detector of claim 2 with:

fifth gate means responsive to the simultaneous occurrence of pulses at tap means of said second and third sections separated by an amount equivalent to the time between said framing pulses for generating a fifth signal;

sixth gate means responsive to the simultaneous occurrence of pulses at tap means of said third and fourth sections separated by an amount equivalent to the time between said framing pulses for generating a sixth signal; and third inhibit means responsive to the simultaneous occurrence of said fifth and sixth signals for generating a third inhibit signal, said bracket detection means beng additionally responsive to said third inhibit signal to inhibit sampling of said information pulse position tap means.

4. The improved beacon target detector of claim 1 or 3 wherein said received signal may include a special indentification pulse occurring a predetermined time after the second framing pulse and including:

additional inhibit means responsive to the simultaneous occurrence of a pulse in said fourth section at the tap means spaced from said fist framing pulse tap means by an amount equivalent to the time between said special identification pulse and said second framing pulse and a pulse in said third section at the tap means spaced from said second framing pulse tap means by an amount equivalent to the time between said special identification pulse and said second framing pulse for generating an additional inhibit signal, said bracket detection means being additionally responsive to said additional inhibit signal to inhibit sampling of said informational pulse position tap means.

5. The improved beacon target detector of claim 4 wherein said delay line is comprised of a plurality of flip-flops.

6. The improved beacon target detector of claim 5 wherein selected ones of said output tap means comprise an OR gate having its input terminals connected to sense the state of predetermined flip-flops adjacent to one another in said delay line.

7. The improved beacon target detector of claim 5 wherein said output tap means are spaced generally 14 flip-flops apart and said clock pulses occur at 103.5 nanosecond intervals.

* * * * *